United States Patent [19]

Takamizawa et al.

[11] Patent Number: 4,538,401
[45] Date of Patent: Sep. 3, 1985

[54] CONTROL LEVER ASSEMBLY IN A SELF-PROPELLED LAWN MOWER

[75] Inventors: Masae Takamizawa; Shigenobu Kan; Masato Mukainakano, all of Saitama, Japan

[73] Assignee: Honda Giken Kogyo Kabushiki Kaisha, Tokyo, Japan

[21] Appl. No.: 543,584

[22] Filed: Oct. 19, 1983

[30] Foreign Application Priority Data

Oct. 20, 1982 [JP] Japan .................................. 57-157489
Aug. 10, 1983 [JP] Japan .................................. 58-146980

[51] Int. Cl.³ ............................................. A01D 75/20
[52] U.S. Cl. ..................................... 56/11.8; 56/10.8; 74/480 R; 180/19.3
[58] Field of Search ................... 56/10.5, 10.8, 11.3, 56/11.8; 74/480; 180/19.3, 272; 192/0.094

[56] References Cited

U.S. PATENT DOCUMENTS

| | | | |
|---|---|---|---|
| 2,292,091 | 8/1942 | Rhodes | 74/480 |
| 2,504,258 | 4/1950 | Elenewicz | 74/480 |
| 3,250,146 | 5/1966 | Schlosser | 74/480 |
| 4,212,141 | 7/1980 | Miyazawa et al. | 56/11.8 |
| 4,327,539 | 5/1982 | Bricko et al. | 56/11.3 |

Primary Examiner—Robert P. Swiatek
Assistant Examiner—David L. Tarnoff
Attorney, Agent, or Firm—Armstrong, Nikaido, Marmelstein & Kubovcik

[57] ABSTRACT

A control lever assembly for a self-propelled lawn mower including a first control lever for selectively connecting and disconnecting a first clutch operatively coupled between a prime mover and wheels, a second control lever for selectively connecting and disconnecting a second clutch operatively coupled between the prime mover and a grass-cutting blade, and an engagement element mounted on the second control lever and engageable with the first control lever to cause the second control lever to be moved in a direction to connect the second clutch when the first control lever is moved in a direction to connect the first clutch. The control lever assembly also includes a mechanism for moving the engagement element between an operative position in which the engagement element is engageable with the first control lever and an inoperative position in which the engagement element is held out of engagement with the first control lever. With this arrangement, the lawn mower can be propelled while stopping the blade at rest against rotation as desired.

3 Claims, 13 Drawing Figures

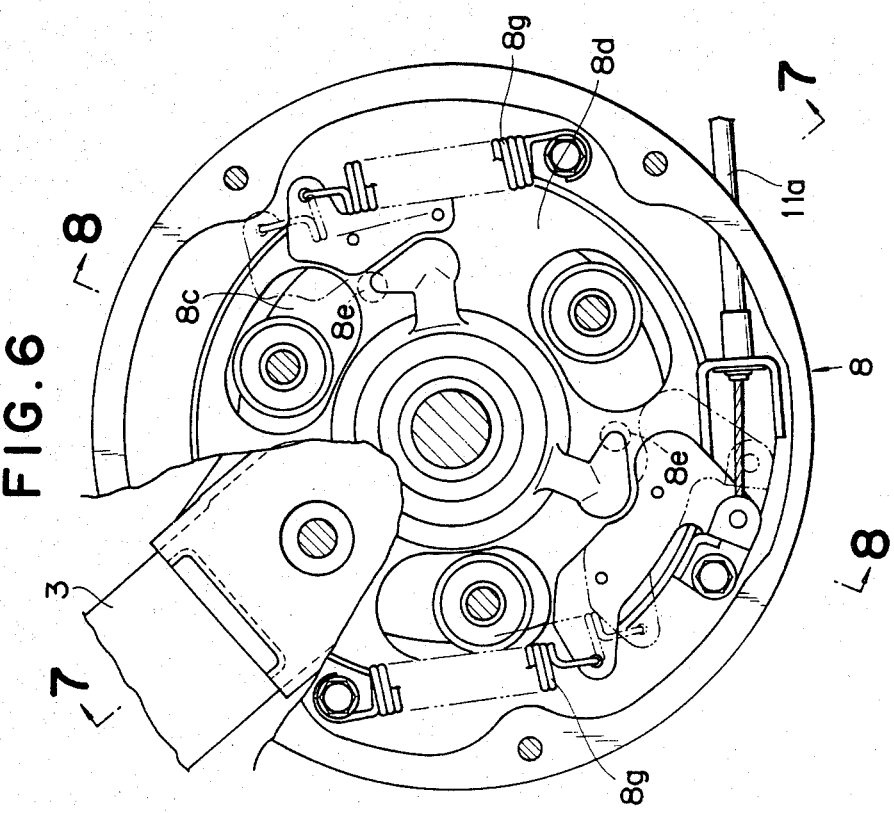
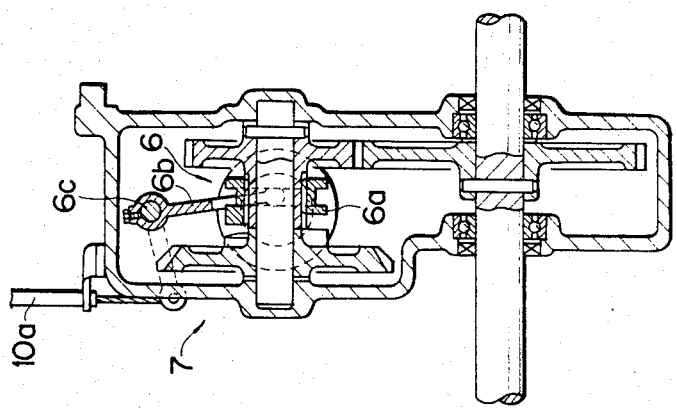

CONTROL LEVER ASSEMBLY IN A SELF-PROPELLED LAWN MOWER

BACKGROUND OF THE INVENTION

1. Field of the Invention

The present invention relates to a control lever assembly in a self-propelled lawn mower, and more particularly to such a control level assembly having a first control lever for controlling a clutch for disconnectably transmitting power to driving wheels of the self-propelled lawn mower, and a second control lever for controlling another clutch for disconnectably transmitting power to a grass-cutting blade.

2. Description of the Prior Art

One known type of self-propelled rotary lawn mower, as disclosed in Japanese Utility Model Laid-Open Publication No. 54-115363, has a first control lever mounted on a handle for connecting and disconnecting a first clutch for driving wheels of the lawn mower, and a second control lever mounted on the handle in juxtaposed relation to the first control lever for connecting and disconnecting a second clutch for controlling the operation of a grass-cutting blade. In operation, the first control lever is actuated in a direction to connect the first clutch until it engages a projection on the second control lever. Then, the continued movement of the first control lever causes the second control lever to be actuated in a direction to connect the second clutch. Therefore, the grass-cutting blade is rotated while the lawn mower is moving along simply by operating the first control lever only. The prior lawn mower is however disadvantageous in that the second control lever is necessarily actuated at all times when the first control lever is operated upon. When it is desired to move the lawn mower for dumping off the cut grass or simply toward another location requiring grass cutting, it is not necessary to rotate the blade and the second and hence first control levers should be brought into the inoperative position. Consequently, the lawn mower must be manually moved around as the first clutch remains disconnected.

The present invention has been made in an effort to overcome the foregoing prior problem.

SUMMARY OF THE INVENTION

According to the present invention, there is provided a control lever assembly in a self-propelled lawn mower including a prime mover, at least one wheel drivable by the prime mover, a blade drivable by the prime mover for cutting grass, a first clutch operatively coupled between the prime mover and the wheel, and a second clutch operatively coupled between the prime mover and the blade, the control lever assembly comprising a first control lever for selectively connecting and disconnecting the first clutch, a second control lever for selectively connecting and disconnecting the second clutch, an engagement element mounted on the second control lever and engageable with the first control lever to cause the second control lever to be moved in the direction to connect the second clutch when the first control lever is moved in a direction to connect the first clutch, and a mechanism for moving the engagement element between an operative position in which the engagement element is engageable with the first control lever and an inoperative position in which the engagement element is held out of engagement with the first control lever.

Accordingly, it is an object of the present invention to provide a control lever assembly in a self-propelled lawn mower, capable of moving the lawn mower while keeping a grass-cutting blade deactivated against rotation.

Another object of the present invention is to provide a control lever assembly in a self-propelled lawn mower, which allows simple and easy switching operation of a lawn mower control lever and a grass-cutting blade control lever between engageable and released positions.

The above and other objects, features and advantages of the present invention will become more apparent from the following description when taken in conjunction with the accompanying drawngs in which preferred embodiments of the present invention are shown by way of illustrative example.

BRIEF DESCRIPTION OF THE DRAWINGS

FIG. 5 is an enlarged cross-sectional view taken along line 5—5 of FIG. 4;

FIG. 6 is a plan view, partly in cross section, of a clutch for driving a grass-cutting blade in the lawn mower;

DESCRIPTION OF THE PREFERRED EMBODIMENTS

Figure 1:
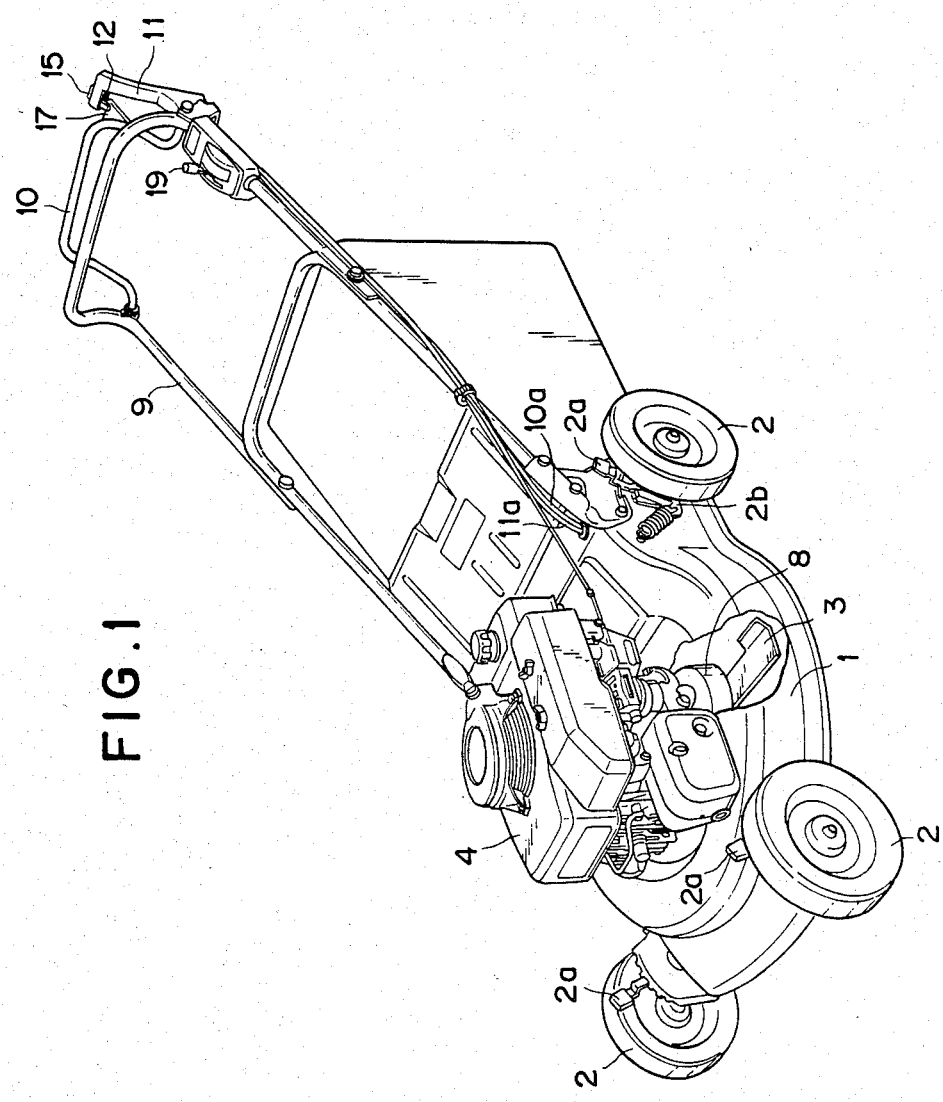
FIG. 1 is a perspective view, partly broken away, of a self-propelled lawn mower incorporating a control lever assembly according to a first embodiment of the present invention.

As shown in FIG. 1, a self-propelled rotary lawn mower has a housing 1 equipped with front and rear pairs of wheels 2 vertically adjustably mounted respectively by swingable arms 2b having levers 2a on the housing 1. the housing 1 accommodates a rotary blade 3 for cutting grass therein. An engine 4 is disposed on an upper surface of the housing 1. The engine 4 is operatively connected to the rear wheels 2 through a propeller shaft 5 (FIG. 4) and a speed reducer 7 having a first clutch 6, and also connected to the blade 3 through a second clutch 8 positioned directly below the engine 4. The lawn mower also has a handle 9 extending rearward from the housing 1 and supporting on its end remote from the housing 1 a first control lever 10 for connecting and disconnecting the first clutch 6 and a second control lever 11 adjacent to the first control lever 10 for connecting and disconnecting the second clutch 8.

Figure 4:
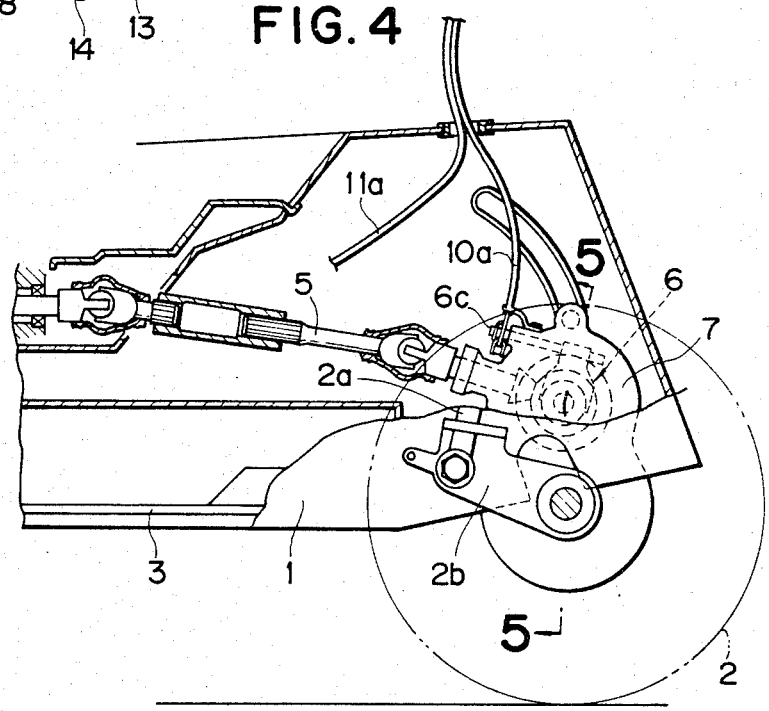
FIG. 4 is a fragmentary side elevational view, with parts in cross section, of a housing portion of the lawn mower in which a clutch for moving the lawn mower is disposed.

The first clutch 6 for moving the lawn mower comprises a known dog clutch having, as illustrated in FIGS. 4 and 5, a fork member 6b held in engagement with a slider 6a and attached to a fork spindle 6c. When the first control lever 10 is turned forward to a clutch-connecting position, the spindle 6c is angularly moved by a wire 10a coupled to the first control lever 10 to connect the clutch 6 for thereby transmitting power from the engine 4 to the rear wheels 2.

Figure 7:
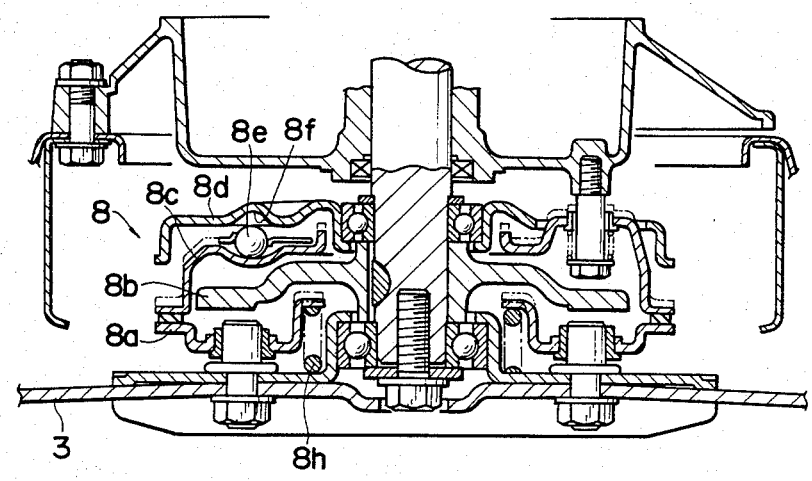
FIG. 7 is a cross-sectional view taken along line 7—7 of FIG. 6.
Figure 8:
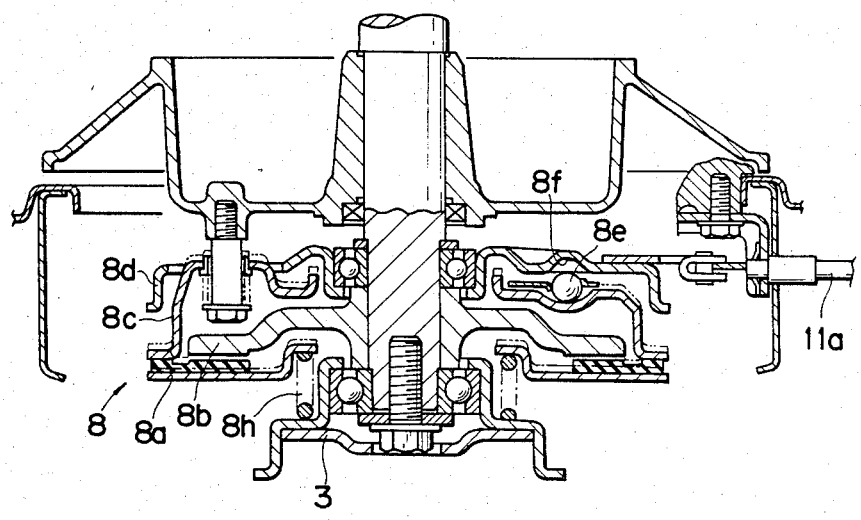
FIG. 8 is a cross-sectional view taken along line 8—8 of FIG. 6.

As shown in FIGS. 6 through 8, the second clutch 8 for driving the blade 3 is composed of a clutch plate 8a connected to the blade 3, a drive flange 8b disposed above the clutch plate 8a and coupled to the engine 4, a presser plate 8c engageable with the clutch plate 8a for vertically moving the latter, and a cam plate 8d located upwardly of the presser plate 8c. The cam plate 8d has cam grooves 8f receiving therein balls 8e interposed between the presser plate 8c and the cam plate 8d and having varying depths along the circumferential direction of the cam plate 8d. When the second control lever 11 is turned forward to a clutch-connecting position, the cam plate 8d is angularly moved about its own axis by a wire 11a joined to the second control lever 11 against the bias of return springs 8g until the deeper portions of the cam grooves 8f are positioned over the balls 8e, respectively. The balls 8e and hence the presser plate 8c are moved upwardly, allowing the clutch plate 8a to be brought into frictional engagement with the drive flange 8b under the resiliency of a clutch spring 8h. The clutch 8 is now connected to transmit power from the engine 4 to the blade 3.

Figure 2:
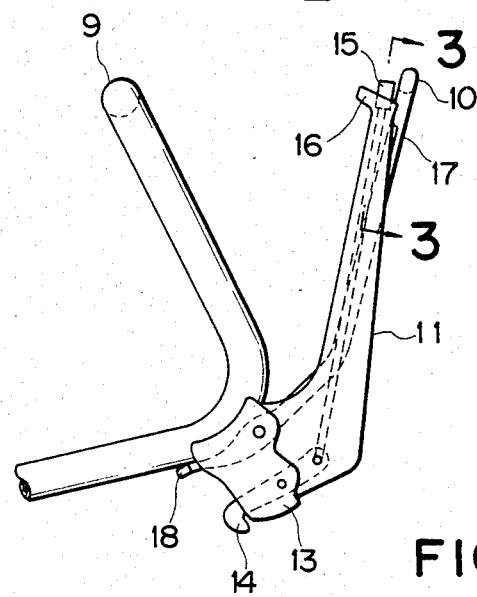
FIG. 2 is a side elevational view of the control lever assembly shown in FIG. 1.
Figure 3:
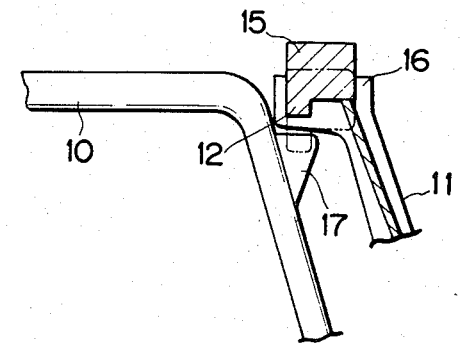
FIG. 3 is an enlarged cross-sectional view taken along line 3—3 of FIG. 2.

As the first control lever 10 is moved to the clutch-connecting position, it engages the second control lever 11 to move the latter therewith to the clutch-connecting position. According to a first embodiment, as shown in FIGS. 1 through 3, the second control lever 11 has an engagement portion 12 with which the first control lever 10 is engageable, and the engagement portion 12 is movable between a lower operative position in which it engages the first control lever 10 and an upper inoperative position in which it is held out of engagement with the first control lever 10. More specifically, as illustrated in FIGS. 2 and 3, the engagement portion 12 projects integrally from a knob 15 which actuates a locking member 14 into engagement with a lever attachment bracket 13 to lock the second control lever 11 in a clutch-disconnecting position. The knob 15 is movably mounted in a grip 16 at the upper end of the second control lever 15. When the knob 15 is pushed, it remains pushed in a lower unlocking position to keep the locking member 14 unlocked from the bracket 13. When the knob 15 is pushed again, it returns to an upper locking position to lock the locking member 14 on the bracket 13. In the upper locking position of the knob 15, the engagement portion 12 is retracted into the grip 16 in the upper inoperative position. In the lower unlocking position, however, the engagement portion 12 projects into the lower operative position located in the path of angular movment of an abutment 17 projecting from the first control lever 10 as shown in FIG. 3.

As illustrated in FIG. 2, the first control lever 10 has a stop 18 for engaging the locking member 14 to prevent the same from being unlocked from the bracket 13 when the first control lever 10 is turned to the clutch-connecting position. As shown in FIG. 1, the handle 9 supports thereon a throttle lever 19 for controlling operation of the engine 4.

Operation of the self-propelled rotary lawn mower thus constructed is as follows: The engine 4 is started, and the knob 15 is pushed into the lower unlocking position. When the first control lever 10 is moved to the clutch-connecting position, the abutment 17 on the first control lever 10 engages the engagement portion 12 projecting from the second control lever 11. Continued forward movement of the first control lever 10 brings the first and second control levers 10, 11 to the clutch-connecting position. The first and second clutches 3, 8 are connected to cause the lawn mower to move along and the blade 3 to rotate.

Conversely, when the knob 15 remains in the upper locking position and the first control lever 10 is turned to the clutch-connecting position, the second control lever 11 is kept in the clutch-disconnecting position since the engagement portion 12 is in the inoperative position. Only the first control lever 10 is therefore moved into the clutch-connecting position. In this mode of operation, the lawn mower is propelled while the blade 3 is prevented from rotation.

It is also possible to rotate the blade 3 while the lawn mower is held at rest by moving only the second control lever 11 to the clutch-connecting position.

FIGS. 9 through 13 show a control lever assembly according to a second embodiment of the present invention. With the control lever assembly of the first embodiment, the first and second control levers 10, 11 are brought into mutually engageable relation only when the knob 15, or a third member, is actuated in a direction different from that in which the first and second control levers 10, 11 are movable. According to the second embodiment, however, no such third member is required.

Figure 9:
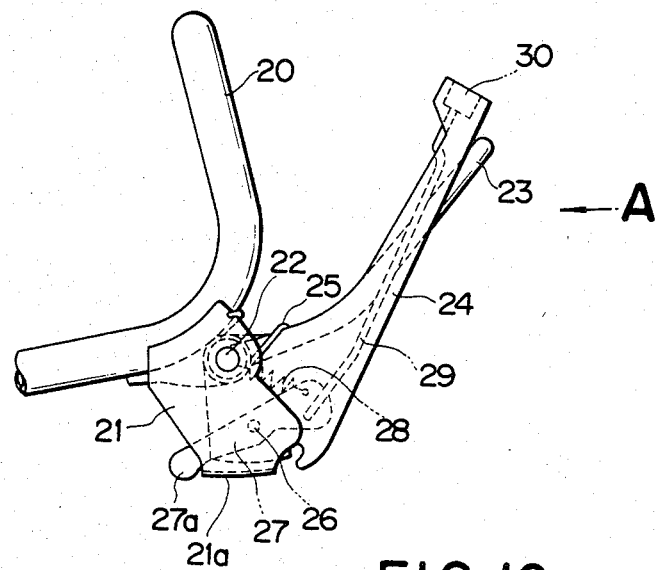
FIG. 9 is a a side elevational view of a control lever assembly according to a second embodiment of the present invention.
Figure 10:
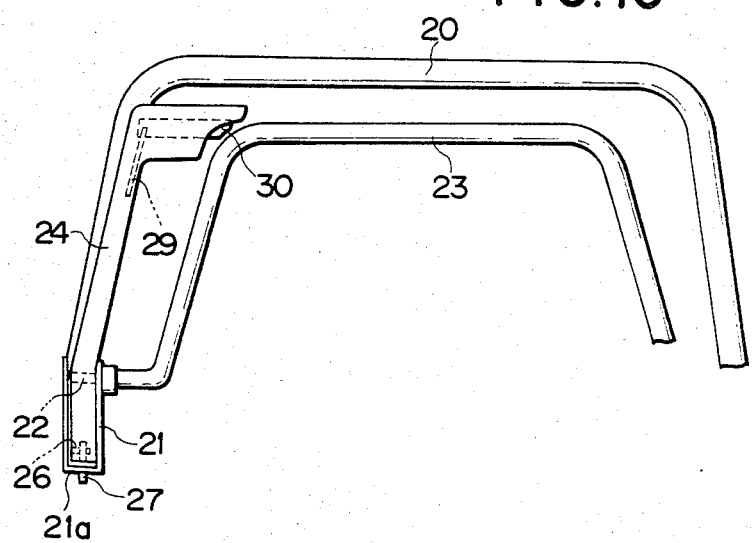
FIG. 10 is a rear elevational view of the control lever assembly as seen in the direction of the arrow A in FIG. 9.

As shown in FIGS. 9 and 10, a lever attachment bracket 21 having a bottom wall 21a is fixed to a lawn mower handle 20, the bracket 21 having a channel-shaped cross section. A shaft 22 is mounted on and extends transversely through the bracket 21. On the shaft 22, there are angularly movably mounted a first control lever 23 for connecting and disconnecting a clutch for moving a lawn mower and a second control lever 24 for connecting and disconnecting a clutch for driving a grass-cutting blade. The first and second control levers 23, 24 are angularly movable independently of each other. The first control lever 23 is normally biased by a return spring (not shown) to turn clockwise (FIG. 9) and the second control lever 24 is normally biased by a return spring 25 to turn clockwise. A cam 27 is pivotally attached by a pin 26 to one end of the second control lever 24 adjacent to the shaft 22. The cam 27 is normally biased to turn counterclockwise (FIG. 9) by a spring 28 acting between an end of the cam 27 and the shaft 22.

Figure 11:
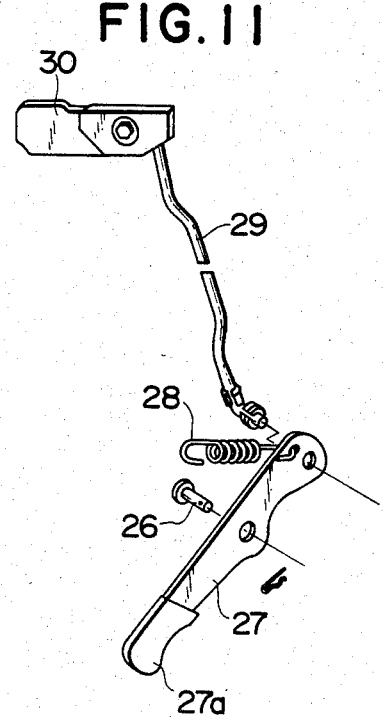
FIG. 11 is an exploded perspective view of components of the control lever assembly of FIG. 9.

As shown in greater detail in FIG. 11, a rod 27 has a lower end attached to the end of the cam 27a and extends along the reverse side of the second control lever 24 (see FIGS. 9 and 10), with a shutter 30 fixed to the upper end of the rod 29. The shutter 30 is in an upper position out of interference with the angular movement with the first control lever 23 when the first and second control levers 23, 24 are in a rear clutch-disconnecting position as shown in FIGS. 9 and 10. Under this condition, the first control lever 23 can be turned forward alone to a clutch-connecting position to move the lawn mower while stopping the blade against rotation. Or alternatively, the second control lever 24 can be turned forward alone to clutch-connecting position to rotate the blade while lawn mower is kept at rest.

Figure 12:
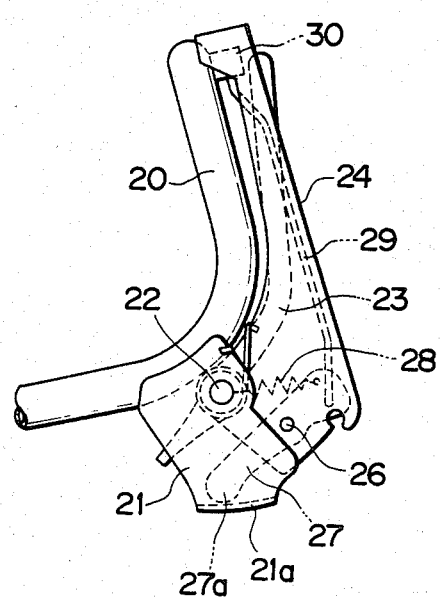
FIGS. 12 and 13 are views similar to FIGS. 9 and 10, respectively, showing the position in which a control lever for moving the lawn mower and a control lever for driving the grass-cutting blade are simultaneously actuated in mutual engagement.
Figure 13:
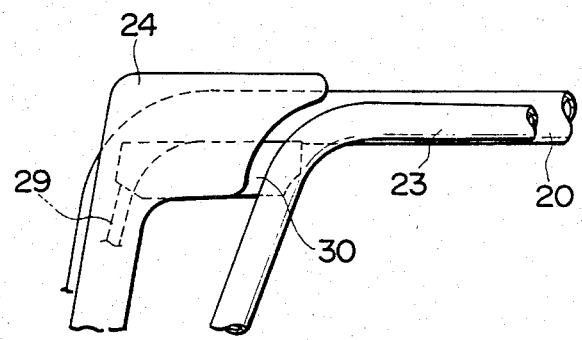

The mode of operation in which the lawn mower is moved along and at the same time the blade is rotated will be described with reference to FIGS. 12 and 13.

The second control lever 24 is turned slightly forward about the shaft 22 from the position shown in FIG. 9. The pin 26 with the cam 27 pivotally mounted thereon is also turned about the shaft 22 until a distal end 27a of the cam 27 rides onto an upper surface of the wall 21a of the bracket 21. At this time, the cam 27 turnes clockwise about the pin 26 while tensioning the spring 28. The turning movement of the cam 27 lowers the rod 29 to move the shutter 30 secured thereto downwardly into partially overlapping relation to the first control lever 23 as shown in FIG. 13.

The first control lever 23 is now turned forward about the shaft 22. The shutter 30 is engaged by the first control lever 23, and then the second and first control levers 24, 23 are turned forward in unison to the clutch-connecting position. Therefore, the lawn mower is moved along and simultaneously the blade is rotated to cut grass. The control lever assembly according to the second embodiment enables the first and second control levers 23, 24 only, to control the movement of the lawn mower and the rotation of the blade highly efficiently.

The control lever assembly according to the present invention can be incorporated not only in lawn mowers but also in other self-propelled machines such as cultivators, for example.

Although certain preferred embodiments have been shown and described, it should be understood that many changes and modifications may be made therein without departing from the scope of the appended claims.

What is claimed is:

1. A control lever assembly in a self-propelled lawn mower including a prime mover, at least one wheel drivable by said prime mover, a blade drivable by said prime mover for cutting grass, a first clutch operatively coupled between said prime mover and said wheel, and a second clutch operatively coupled between said prime mover and said blade, said control lever assembly comprising:
    (a) a first control lever for selectively connecting and disconnecting said first clutch;
    (b) a second control lever for selectively connecting and disconnecting said second clutch;
    (c) an engagement element mounted on said second control lever and engageable with said first control lever to cause said second control lever to be moved in a direction to connect said second clutch when said first control lever is moved in a directions to connect said first clutch; and
    (d) means for moving said engagement element between an operative position in which said engagement element is engageable with said first control lever and an inoperative position in which said engagement element is held out of engagement with said first control lever, said means comprising a knob integrally formed with said engagement element for moving said engagement element between said operative and inoperative positions and including a mechanism connected to said knob for locking said second control lever in a position to disconnect said second clutch.

2. A control lever assembly in a self-propelled lawn mower including a prime mover, at least one wheel drivable by said prime mover, a blade drivable by said prime mover for cutting grass, a first clutch operatively coupled between said prime mover and said wheel, and a second clutch operatively coupled between said prime mover and said blade, said control lever assembly comprising:
    (a) a first control lever for selectively connecting and disconnecting said first clutch;
    (b) a second control lever for selectively connecting and disconnecting said second clutch;
    (c) an engagement element mounted on said second control lever and engageable with said first control lever to cause said second control lever to be moved in a direction to connect said second clutch when said first control lever is moved in a directions to connect said first clutch; and
    (d) means for moving said engagement element between an operative position in which said engagement element is engageable with said first control lever and an inoperable position in which said engagement lever is held out of engagement with said first control lever wherein said means comprises a cam pivotally mounted on one end of second control lever, a rod connected to one end of said cam and extending longitudinally along said second control lever, said engagement element being mounted on an opposite end of said rod, and a cam guide surface responsive to movement of said second control lever for interfering with and angularly moving said cam to move said engagement element into said operative position.

3. A control lever assembly according to claim 2, including a bracket having said cam guide surface and a shaft on which said second control member is angularly movably supported, and a spring acting between said shaft and said one end of said cam for normally biasing said engagement element in a direction to move toward said inoperative position through said cam.

* * * * *